(12) United States Patent
Danilov et al.

(10) Patent No.: US 11,435,916 B2
(45) Date of Patent: Sep. 6, 2022

(54) MAPPING OF DATA STORAGE SYSTEM FOR A REDUNDANT ARRAY OF INDEPENDENT NODES

(71) Applicant: EMC IP Holding Company LLC, Hopkinton, MA (US)

(72) Inventors: Mikhail Danilov, Saint Petersburg (RU); Konstantin Buinov, Prague (CZ)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 494 days.

(21) Appl. No.: 16/453,774

(22) Filed: Jun. 26, 2019

(65) Prior Publication Data
US 2020/0409582 A1 Dec. 31, 2020

(51) Int. Cl.
*G06F 11/00* (2006.01)
*G06F 3/06* (2006.01)
*G06F 11/20* (2006.01)

(52) U.S. Cl.
CPC .......... *G06F 3/0635* (2013.01); *G06F 3/067* (2013.01); *G06F 3/0616* (2013.01); *G06F 3/0617* (2013.01); *G06F 3/0619* (2013.01); *G06F 3/0644* (2013.01); *G06F 3/0689* (2013.01); *G06F 11/2043* (2013.01); *G06F 11/2089* (2013.01)

(58) Field of Classification Search
CPC .................. G06F 11/2089; G06F 11/2043
See application file for complete search history.

(56) References Cited

U.S. PATENT DOCUMENTS

| | | | | |
|---|---|---|---|---|
| 7,383,381 | B1* | 6/2008 | Faulkner | G06F 3/0607 711/114 |
| 2004/0243650 | A1* | 12/2004 | McCrory | G06F 11/2069 |
| 2011/0202721 | A1* | 8/2011 | Popovski | G06F 11/1076 711/114 |
| 2014/0047263 | A1* | 2/2014 | Coatney | G06F 11/20 714/4.11 |
| 2014/0317438 | A1* | 10/2014 | Ripoll | G06F 11/2017 714/4.11 |
| 2015/0169415 | A1* | 6/2015 | Hildebrand | G06F 3/0617 714/4.5 |
| 2019/0034087 | A1* | 1/2019 | Renauld | G06F 11/1464 |

* cited by examiner

*Primary Examiner* — Philip Guyton
(74) *Attorney, Agent, or Firm* — Amin, Turocy & Watson, LLP

(57) ABSTRACT

Described herein, system that facilitates mapping of redundant array of independent nodes of a storage device. According to an embodiment, a system can comprise generating a first configuration of a storage cluster, wherein the storage cluster comprises a group of nodes and a group of disks, generating a second configuration of the storage cluster using the first configuration, wherein the group of nodes are divided into a first pair of nodes comprising a first node having access to a first group of disks and a second node having access to a second group of disks, and generating a third configuration of the storage cluster using the second configuration, wherein the first node comprises a first mapped node that manages the first group of disks of the first node and enables access to the second group of disks of the second node.

20 Claims, 12 Drawing Sheets

MAPPING OF DATA STORAGE SYSTEM FOR A REDUNDANT ARRAY OF INDEPENDENT NODES

TECHNICAL FIELD

The disclosed subject matter relates to data storage, more particularly, to mapping of redundant array of independent nodes of a storage device comprising of at least one cluster of storage devices to provide high access storage devices.

BACKGROUND

The large increase in amount of data generated by digital systems has created a new set of challenges for data storage environments. Traditional storage area network (SAN) and/or network-attached storage (NAS) architectures have not been designed to support data storage and/or protection at large multi-petabyte capacity levels. Object storage technology can be utilized to meet these requirements. By utilizing object storage technology, organizations can not only keep up with rising capacity levels but can also store these new capacity levels at a manageable cost point.

Conventional data storage techniques can store data in one or more arrays of data storage devices. As an example, data can be stored in an ECS™ (formerly known as ELASTIC CLOUD STORAGE) system, hereinafter ECS™ system, such as is provided by DELL EMC. The example ECS™ system can comprise data storage devices, e.g., disks, etc., arranged in nodes, wherein nodes can be comprised in an ECS cluster. One use of data storage is in bulk data storage. Data can conventionally be stored in a group of nodes format for a given cluster, for example, in a conventional ECS™ system, all disks of nodes comprising the group of nodes are considered part of the group. As such, a node with many disks can, in some conventional embodiments, comprise a large amount of storage that can go underutilized. As an example, a storage group of five nodes, with ten disks per node, at 8 terabytes (TBs) per disk is roughly 400 TB in size. This can be excessively large for some types of data storage, however apportioning smaller groups, e.g., fewer nodes, less disks, smaller disks, etc., can be inefficient in regard to processor and network resources, e.g., computer resource usage, to support these smaller groups. As such, it can be desirable to have more granular logical storage groups that can employ portions of larger real groups, thereby facilitating efficient computer resource usage, e.g., via larger real groups, but still providing smaller logical groups that can be used more optimally for storing smaller amounts of data therein The above-described background relating to ECS™ is merely intended to provide a contextual overview of some current issues and is not intended to be exhaustive. Other contextual information may become further apparent upon review of the following detailed description.

DETAILED DESCRIPTION

Figure 1:
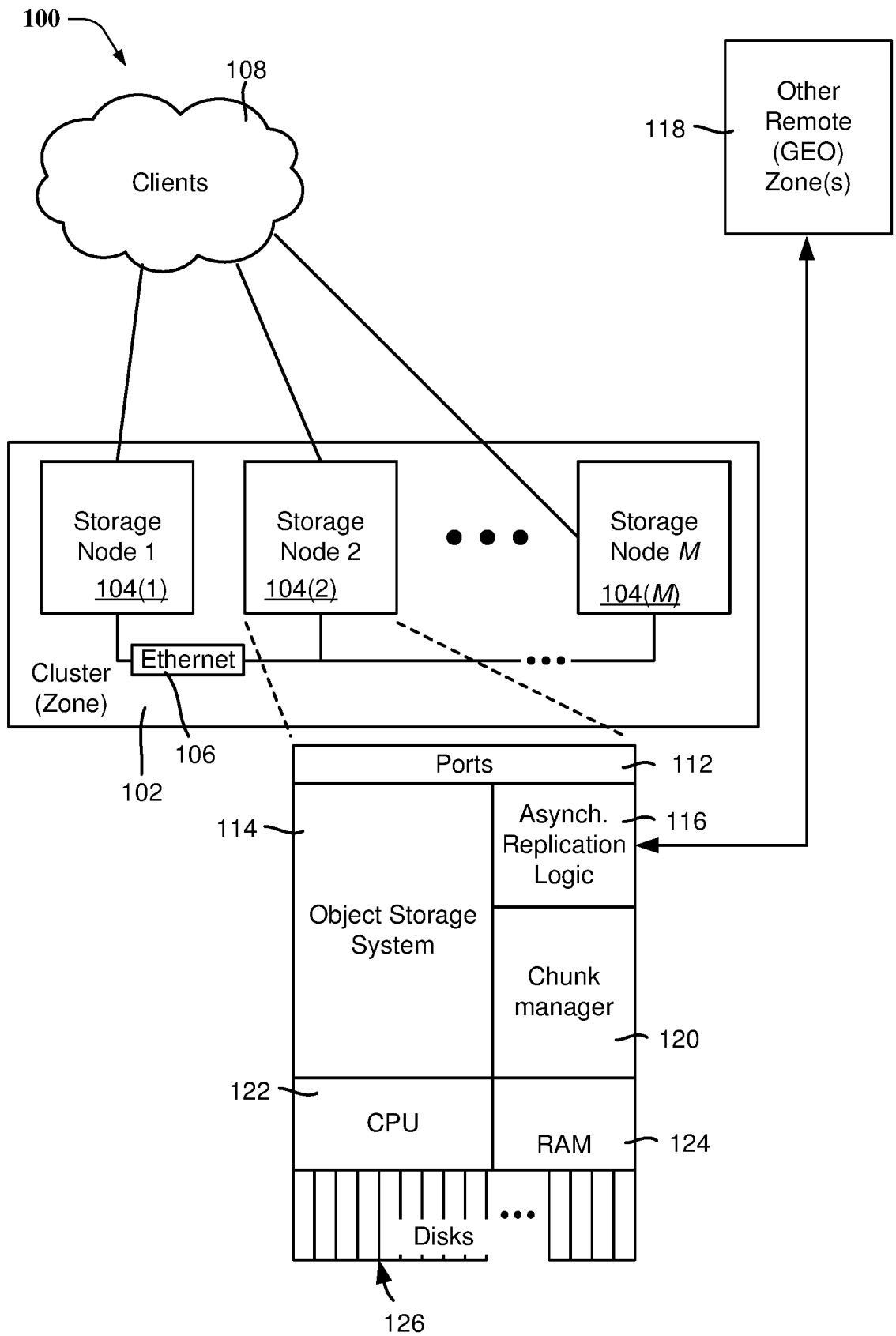
FIG. 1 illustrates a part of a cloud data storage system, in accordance with aspects of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As mentioned, data storage techniques can conventionally store data in one or more arrays of data storage devices. As an example, data can be stored in an ECS™ system such as is provided by DELL EMC. The example ECS™ system can comprise data storage devices, e.g., disks, etc., arranged in nodes, wherein nodes can be comprised in an ECS™ cluster. One use of data storage is in bulk data storage. Data can conventionally be stored in a group of nodes format for a given cluster, for example, in a conventional ECS™ system, all disks of nodes comprising the group of nodes are considered part of the group. As such, a node with many disks can, in some conventional embodiments, comprise a large amount of storage that can go underutilized. As such, it can be desirable to have more granular logical storage groups that can employ portions of larger real groups, thereby facilitating efficient computer resource usage, e.g., via larger real groups, but still providing smaller logical groups that can be used more efficiently for storing smaller amounts of data therein.

In some embodiments of the presently disclosed subject matter, a mapped redundant array of independent nodes, hereinafter a mapped RAIN, can comprise a mapped cluster, wherein the mapped cluster comprises a logical arrangement of real storage devices. In a mapped cluster, a real cluster(s), e.g., a group of real storage devices comprised in one or more hardware nodes, comprised in one or more clusters, can be defined so allow more granular use of the real cluster in contrast to conventional storage techniques. In an aspect, a mapped cluster can comprise nodes that provide data redundancy, which, in an aspect, can allow for failure of a portion of one or more nodes of the mapped cluster without loss of access to stored data, can allow for removal/addition of one or more nodes from/to the mapped cluster without loss of access to stored data, etc. As an example, a mapped cluster can comprise nodes having a data redundancy scheme analogous to a redundant array of independent disks (RAID) type-6, e.g., RAID6, also known as double-parity RAID, etc., wherein employing a node topology and two parity stripes on each node can allow for two node failures before any data of the mapped cluster becomes inaccessible, etc. In other example embodiments, a mapped cluster can employ other node topologies and parity techniques to provide data redundancy, e.g., analogous to RAID0, RAID1, RAID2, RAID3, RAID4, RAID5, RAID6, RAID0+1, RAID1+0, etc., wherein a node of a mapped cluster can comprise one or more disks, and the node can be loosely similar to a disk in a RAID system. Unlike RAID technology, an example mapped RAIN system can provide access to more granular storage in generally very large data storage systems, often on the order of terabytes, petabytes, exabytes, zettabytes, etc., or even larger, because each node can generally comprise a plurality of disks, unlike RAID technologies.

In some embodiments, software, firmware, etc., can hide the abstraction of mapping nodes in a mapped RAIN system, e.g., the group of nodes can appear to be a contiguous block of data storage even where, for example, it can be spread across multiple portions of one or more real disks, multiple real groups of hardware nodes (a real RAIN), multiple real clusters of hardware nodes (multiple real RAINs), multiple geographic locations, etc. For a given real cluster, e.g., real RAIN, that is N nodes wide and M disks deep, a mapped RAIN can consist of up to N' mapped nodes and manage up to M' portions of disks of the constituent real nodes. Accordingly, in an embodiment, one mapped node is expected to manage disks of different real nodes. Similarly, in an embodiment, disks of one real node are expected to be managed by mapped nodes of different mapped RAIN clusters. In some embodiments, the use of two disks by one real node can be forbidden to harden mapped RAIN clusters against a failure of one real node compromising two or more mapped nodes of one mapped RAIN cluster, e.g., a data loss event, etc. Hereinafter, a portion of a real disk can be comprised in a real node that can be comprised in a real cluster and, furthermore, a portion of the real disk can correspond to a portion of a mapped disk, a mapped disk can comprise one or more portions of one or more real disks, a mapped node can comprise one or more portions of one or more real nodes, a mapped cluster can comprise one or more portions of one or more real clusters, etc., and, for convenience, the term RAIN can be omitted for brevity, e.g., a mapped RAIN cluster can be referred to simply as a mapped cluster, a mapped RAIN node can simply be referred to as a mapped node, etc., wherein 'mapped' is intended to convey a distinction from a corresponding real physical hardware component.

In some embodiments, a mapped cluster can be comprised in a real cluster, e.g., the mapped cluster can be N' by M' in size and the real cluster can be N by M in size, where N'=N and where M'=M. In other embodiments, N' can be less than, or equal to, N, and M' can be less than, or equal to, M. It will be noted that in some embodiments, M' can be larger than M, e.g., where the mapping of a M real disks into M' mapped disks portions comprises use of a part of one of the M disks, for example, where 10 real disks (M=10) are mapped into 17 mapped disk portions (M'=17), 11 mapped disk portions (M'=11), 119 mapped disk portions (M'=119), etc. In these other embodiments, the mapped cluster can be smaller than the real cluster. Moreover, where the mapped cluster is sufficiently small in comparison to the real cluster, the real cluster can accommodate one or more additional mapped clusters. In an aspect, where mapped cluster(s) are smaller than a real cluster, the mapped cluster can provide finer granularity of the data storage system. As an example, where the real cluster is 8×8, e.g., 8 nodes by 8 disks, then, for example, four mapped 4×4 clusters can be provided, wherein each of the four mapped 4×4 clusters is approximately ¼th the size of the real cluster. As a second example, given an 8×8 real cluster 16 mapped 2×2 clusters can be provided where each mapped cluster is approximately ¹⁄₁₆th the size of the real cluster. As a third example, for the 8×8 real cluster, 2 mapped 4×8 or 8×4 clusters can be provided and each can be approximately ½ the size of the real cluster. Additionally, the example 8×8 real cluster can provide a mix of different sized mapped clusters, for example one 8×4 mapped cluster, one 4×4 mapped cluster, and four 2×2 mapped clusters. In some embodiments, not all of the real cluster must be comprised in a mapped cluster, e.g., an example 8×8 real cluster can comprise only one 2×4 mapped cluster with the rest of the real cluster not (yet) being allocated into mapped storage space.

Other aspects of the disclosed subject matter provide additional features generally not associated with real cluster data storage. In some embodiments, a mapped cluster can comprise storage space from more than one real cluster. In some embodiments, a mapped cluster can comprise storage space from real nodes in different geographical areas. In some embodiments, a mapped cluster can comprise storage space from more than one real cluster in more than one geographic location. As an example, a mapped cluster can comprise storage space from a cluster having hardware nodes in a data center in Denver. In a second example, a mapped cluster can comprise storage space from a first cluster having hardware nodes in a first data center in Denver and from a second cluster also having hardware nodes in the first data center in Denver. As a further example, a mapped cluster can comprise storage space from both a cluster having hardware nodes in a first data center in Denver and a second data center in Denver. As a further example, a mapped cluster can comprise storage space from a first cluster having hardware nodes in a first data center in Seattle, Wash., and a second data center having hardware nodes in Tacoma, Wash. As another example, a mapped cluster can comprise storage space from a first cluster having hardware nodes in a first data center in Houston, Tex., and a second cluster having hardware nods in a data center in Mosco, Russia.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 illustrates a part of a cloud data storage system such as ECS™ comprising a zone (e.g., cluster) 102 of storage nodes 104(1)-104(M), in which each node is typically a server configured primarily to serve objects in response to client requests (e.g., received from clients 108). The nodes 104(1)-104(M) can be coupled to each other via a suitable data communications link comprising interfaces and protocols such as, but not limited to, Ethernet block 106.

Clients 108 can send data system-related requests to the cluster 102, which in general is configured as one large object namespace; there may be on the order of billions of objects maintained in a cluster, for example. To this end, a node such as the node 104(2) generally comprises ports 112 by which clients connect to the cloud storage system. Example ports are provided for requests via various protocols, including but not limited to SMB (server message block), FTP (file transfer protocol), HTTP/HTTPS (hypertext transfer protocol), and NFS (Network File System); further, SSH (secure shell) allows administration-related requests, for example.

Each node, such as the node 104(2), includes an instance of an object storage system 114 and data services. For a cluster that comprises a "GEO" zone of a geographically distributed storage system, at least one node, such as the node 104(2), includes or coupled to reference tracking asynchronous replication logic 116 that synchronizes the cluster/zone 102 with each other remote GEO zone 118. Note that ECS™ implements asynchronous low-level replication, that is, not object level replication. Typically, organizations protect against outages or information loss by backing-up (e.g., replicating) their data periodically. During backup, one or more duplicate or deduplicated copies of the primary data are created and written to a new disk or to a tape, for example within a different zone. The term "zone" as used herein can refer to one or more clusters that is/are independently operated and/or managed. Different zones can be deployed within the same location (e.g., within the same data center) and/or at different geographical locations (e.g., within different data centers).

In general, and in one or more implementations, e.g., ECS™, disk space is partitioned into a set of large blocks of fixed size called chunks; user data is stored in chunks. Chunks are shared, that is, one chunk may contain segments of multiple user objects; e.g., one chunk may contain mixed segments of some number of (e.g., three) user objects.

A chunk manager 120 can be utilized to manage the chunks and their protection (e.g., via erasure coding (EC)). Erasure coding was created as a forward error correction method for binary erasure channel. However, erasure coding can be used for data protection on data storages. During erasure coding (e.g., utilizing a k+m configuration), the chunk manager 120 can partition a piece of data (e.g., chunk) into k data fragments of equal size. During encoding, redundant m coding fragments are created so that the system can tolerate the loss of any m fragments. Typically, the chunk manager 120 can assign indices to the data fragments (and corresponding coding fragments). In an example, an index can be a numerical value (e.g., 1 to k) that is utilized for erasure coding. Moreover, the index of a data fragment can be utilized to determine a coefficient, within an erasure coding matrix, which is to be combined (e.g., multiplied) with the data fragment to generate a corresponding coding fragment for the chunk. For example, an index value can specify a row and/or column of the coefficient within the erasure coding matrix. As an example, the indices can be assigned based on a defined sequence, in a random order, based on a defined criterion (e.g., to increase probability of complementary data fragments), based on operator preferences, etc. The process of coding fragments creation is called encoding. The process of data fragments recovery using available data and coding fragments is called decoding.

In one example embodiment, GEO erasure coding can also be utilized, wherein if a distributed storage 100 is to tolerate the loss of any m zones/clusters/chunks, then GEO erasure coding can begin at each zone by replicating each new chunk to at least m remote zones. As a result, there are m backup copies of each chunk. Typically, there is one primary backup copy, which can be utilized for encoding. Encoding is performed by one zone for primary backup chunks and other zones replicate to it. Once a zone has k primary chunks replicated from different remote zones, the zone can perform encoding using the chunks replicated to it as data fragments. The chunk size is fixed, in ECS™, with padding or other data to complement, wherein the other data is added as needed. The result of encoding is m data portions of a chunk size. They are stored as chunks of a specific type called coding chunks. After encoding is complete, the zone can store one coding chunk locally and move other m−1 coding chunks to remote zones making sure all the k+m data and coding chunks are stored at different zones whenever possible. Afterwards, the primary backup chunks used for encoding and their peer backup chunks at other zones can be deleted.

In some embodiments, the chunk manager 120 can efficiently generate combined data protection sets during consolidating two or more erasure-coded data portions (e.g., normal/source chunks) that have a reduced sets of data fragments. As an example, chunk manager 120 can verify that the two or more erasure-coded data portions are complementary (e.g., do not have data fragments with the same index) and perform a summing operation to combine their corresponding coding fragments to generate a combined protection set. A CPU 122 and RAM 124 are shown for completeness; note that the RAM 124 can comprise at least some non-volatile RAM. The node includes storage devices such as disks 126, comprising hard disk drives and/or solid-state drives. It is noted that the storage devices can comprise volatile memory(s) or nonvolatile memory(s), or both volatile and nonvolatile memory(s). Examples of suitable types of volatile and non-volatile memory are described below with reference to FIG. 11. The memory (e.g., data stores, databases, tables, etc.) of the subject systems and methods is intended to comprise, without being limited to, these and any other suitable types of memory.

Figure 2:
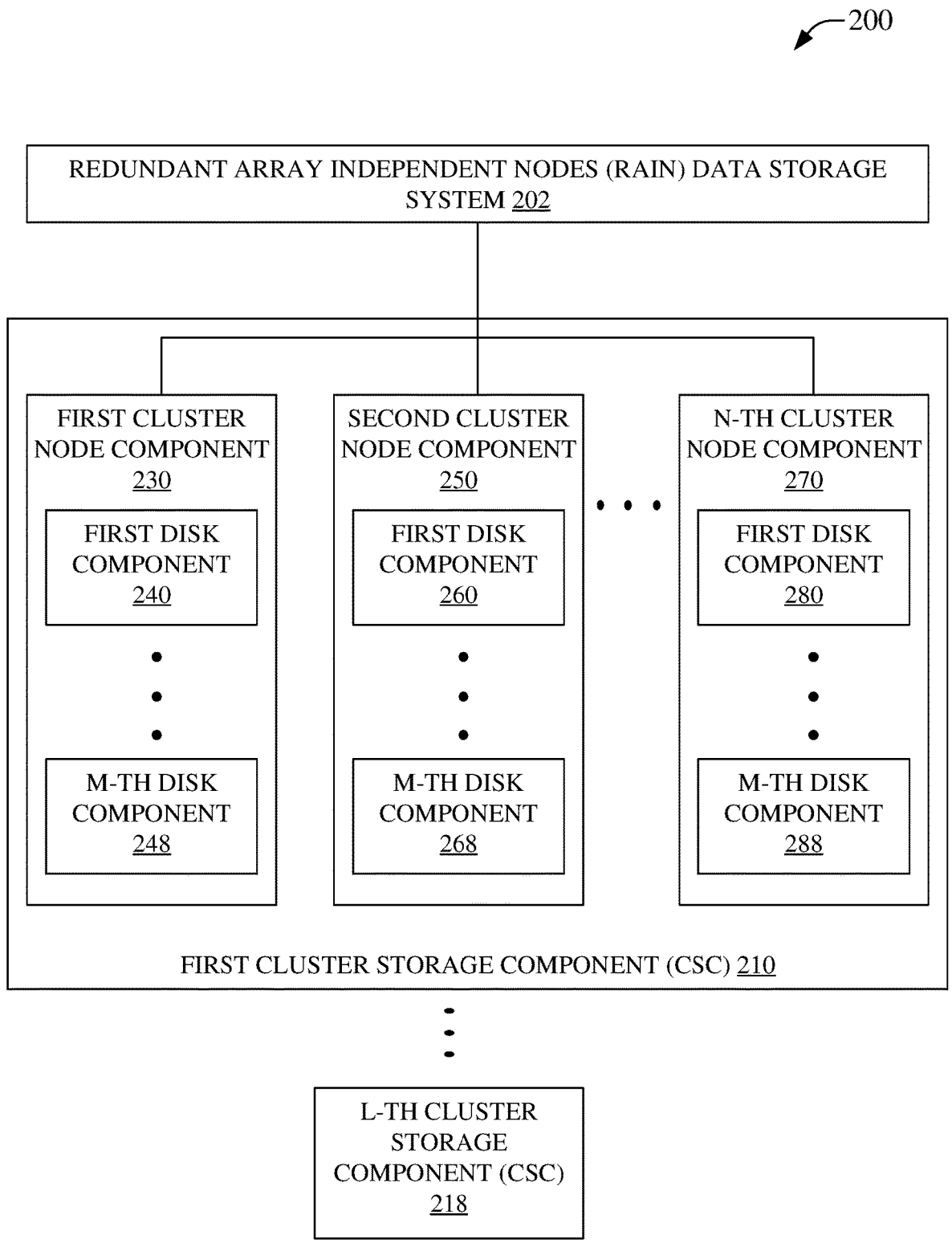
FIG. 2 illustrates an example of a system, which can facilitate storage of data in a mapped redundant array of independent nodes, in accordance with aspects of the subject disclosure.

FIG. 2 illustrates an example of a system 200, which can facilitate storage of data in a mapped redundant array of independent nodes, in accordance with aspects of the subject disclosure. System 200 can comprise a RAIN Data Storage System 202, which can be embodied in a cluster storage system. In an embodiment, RAIN Data Storage System 202 can be embodied in a real cluster storage system comprising one or more hardware nodes that each comprise one or more storage devices, e.g., hard disks, optical storage, solid state storage, etc. RAIN Data Storage System 202 can receive data for storage in a mapped cluster, e.g., data for storage in mapped RAIN cluster storage system. The data can be stored by portions of the one or more storage devices of RAIN Data Storage System 202 according to a logical mapping of the storage space, e.g., according to one or more mapped clusters.

In an aspect, a mapped cluster can be a logical allocation of storage space of RAIN Data Storage System 202. In an embodiment, a portion of a real disk can be comprised in a real node that can be comprised in a real cluster and, furthermore, a portion of the real disk can correspond to a portion of a mapped disk, a mapped disk can comprise one or more portions of one or more real disks, a mapped node can comprise one or more portions of one or more real nodes, a mapped cluster can comprise one or more portions of one or more real clusters, etc. Accordingly, in an embodiment, RAIN Data Storage System 202 can support a mapped cluster enabling data to be stored on one or more disk, e.g., first disk component 240 through M-th disk component 248 of a first cluster node component 230, first disk component 260 through M-th disk 268 of a second cluster node component 250 through first disk component 280 through M-th disk component 288 of N-th cluster node component 270 of first cluster storage component (CSC) 210, through disks corresponding to CSCs of L-th cluster storage component 218, according to a mapped cluster schema.

In some embodiments, the first CSC 210, comprises multiple nodes (e.g., the first cluster node component 230 through the N-th cluster node component) that are connected to each other nodes. This architecture is referred to as Share-Nothing (SN) architecture. In some embodiments, the SN architecture mapping provides that none of the node components (e.g. 230, 250, and 270) have direct access to disks (e.g., first disk component 240 through M-th disk component 248) of the other connected nodes (e.g. nodes 230, 250 and 270).

Figure 3:
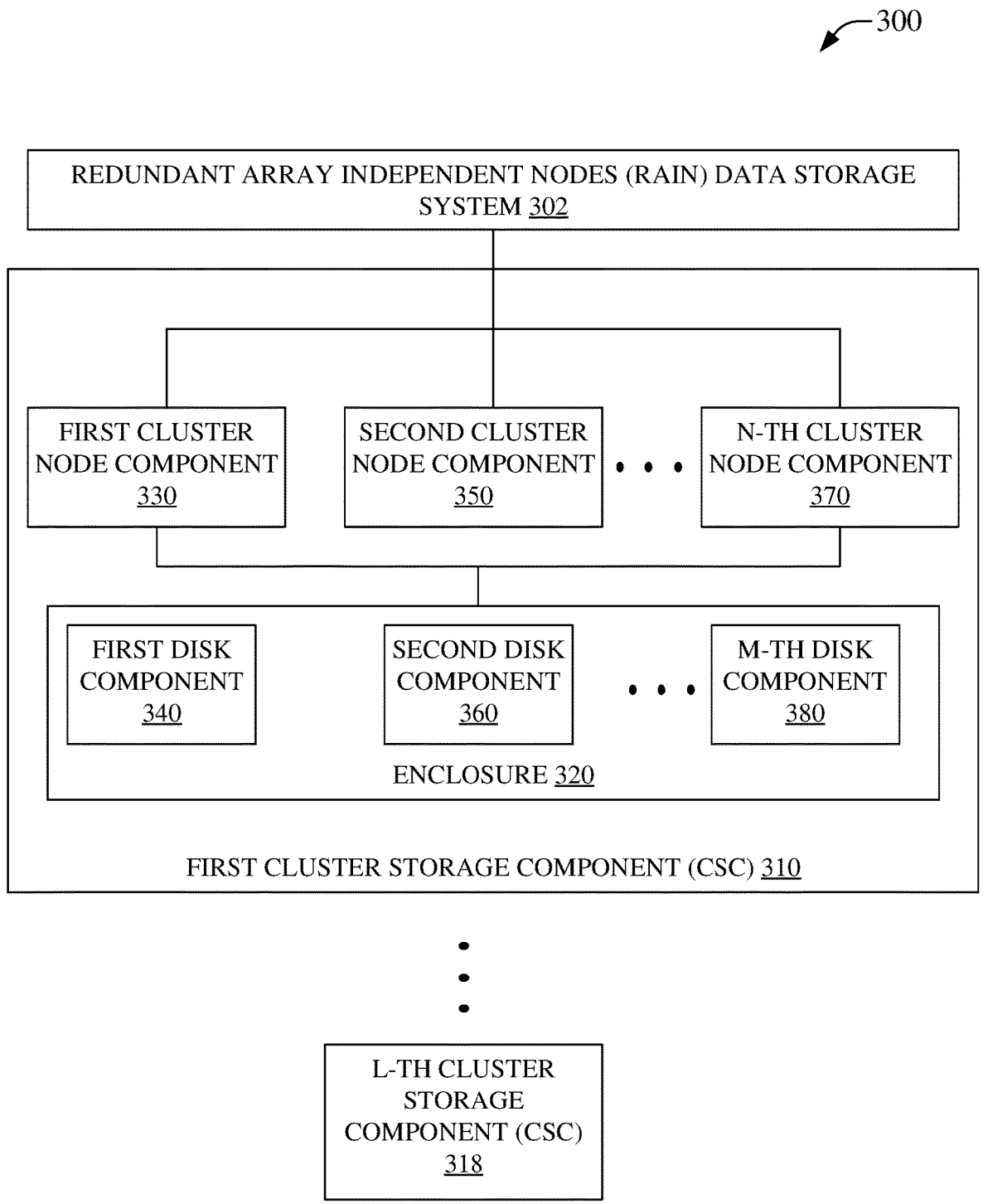
FIG. 3 illustrates an example of a system, which can facilitate storage of data in a mapped redundant array of independent nodes, in accordance with aspects of the subject disclosure.

FIG. 3 illustrates an example of a system 300, which can facilitate storage of data in a mapped redundant array of independent nodes, in accordance with aspects of the subject disclosure. System 300 can comprise a RAIN Data Storage System 302, first cluster storage component 310 through L-th cluster storage component 318. In some embodiments, each CSC 310 comprises a first cluster node component 330, a second cluster node component 350 through an N-th cluster node component 370 (hereinafter referred to as group of nodes) that are connected to each other. Each the group of nodes is connected to an enclosure 320, wherein the enclosure 320 comprises a first disk component 340, a second disk component 360 through a M-th disk component 380 (hereinafter referred to as group of disks). In some embodiments, a Share-Everything (SE) architecture is employed, wherein all nodes of the group of nodes have access to all the group of disks from a shared pool (e.g., enclosure 320). Thus, first cluster node component 330 has access to all the disks. If the first cluster node component 330 fails, other group of nodes can access the group of disks.

In some embodiments, all cluster components (e.g., 330 through 370), are divided into highly available/accessible (HA) pairs, wherein a subset of disks (e.g., 340 through 380) are associated with each HA pair of nodes. In some embodiments, the HA architecture provides that node failure(s) and disk failure(s) are decoupled (e.g., nodes and disk fail independently). In some embodiments, a pair of nodes are associated with each disk of group of disks. Thus, in case of a node failure, there is still the failed node's counter part (e.g., remaining paired node) that can manage the disks associated with the failed node.

A mapped RAIN (or mapped cluster) is built above a real cluster (RAIN). A real cluster comprises N nodes and each cluster node manages M disks. The N*M disks form a disk pool. A mapped RAIN can be built using disks from a disk pool. A mapped cluster may consist of N' mapped nodes. Each mapped node may manage M' disks allocated from a disk pool. One mapped node may manage disks of different mapped RAINs. There is a mapping table that contains information about relationship between mapped nodes and disks from a disk pool. In some embodiments, the mapped RAIN is expected to have a mapping layer. It can be a software and/or firmware layer, which uses a mapping table to tie different component of a mapped RAIN together.

In some embodiments, there is no limitations on distributing disks among mapped nodes. In some embodiments, the distribution of disks has a limitation, wherein two disks managed by one real node should not go to different mapped nodes of one mapped RAIN. This limitation is referred to a Mapped RAIN limitation.

In some embodiments, M' can be greater than M. In such a case, N' is fewer that N and one mapped node manages disks from 2 or more real nodes. Note that N' should not be greater than N because the only way to do so is to violate the Mapped RAIN limitation.

In some embodiments, one real RAIN may accommodate a plurality of mapped clusters. These mapped clusters may have different configurations (N'×M') and may use different protection schemes (e.g., erasure coding 10+2 or triple mirroring). A mapped RAIN may protect data similar to traditional cluster does.

Figure 4:
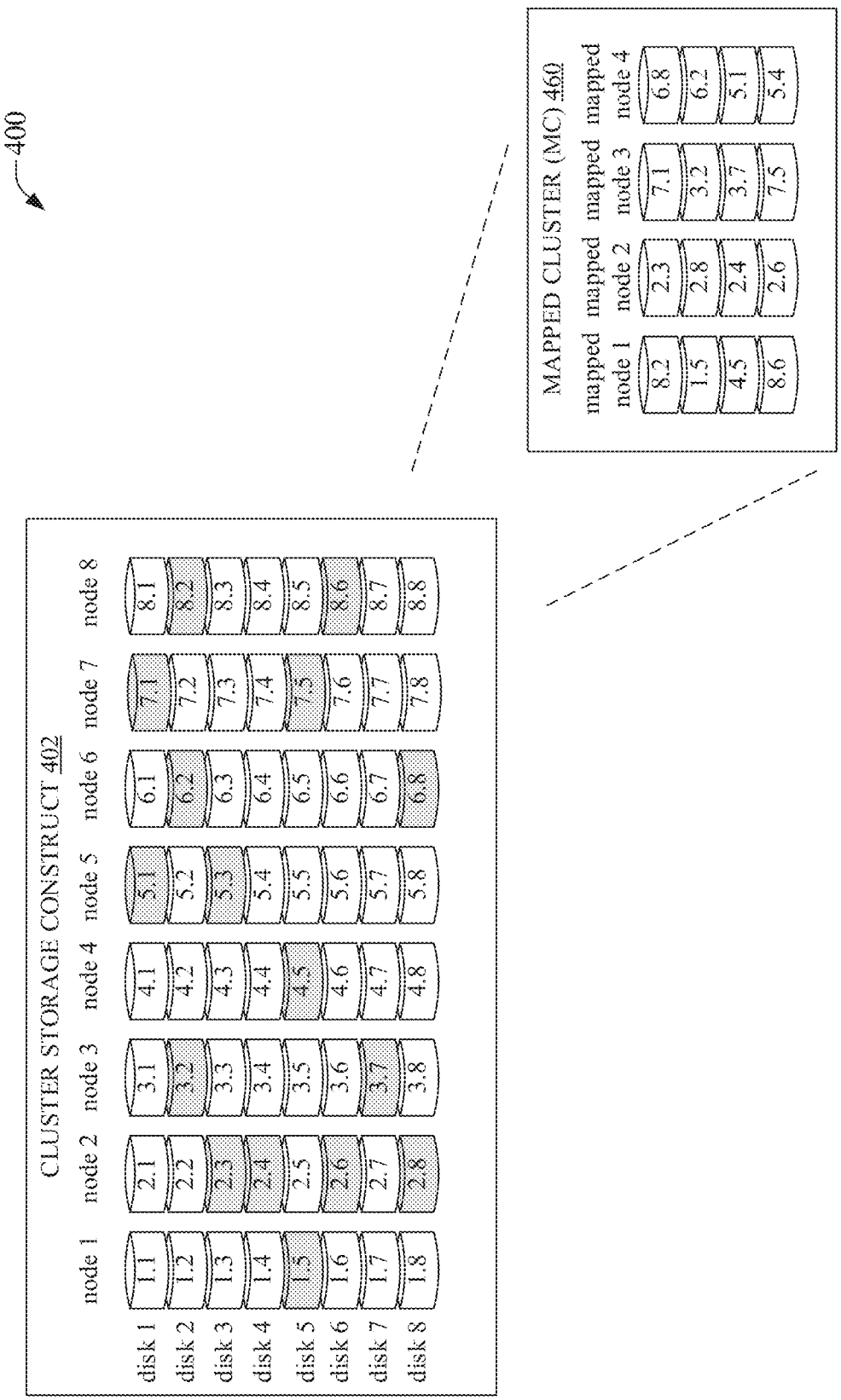
FIG. 4 illustrates an example of a real RAIN architecture 300 accordance with one or more embodiments described herein.

FIG. 4 illustrates an example of a real RAIN architecture 400 accordance with one or more embodiments described herein. Repetitive description of like elements employed in respective embodiments is omitted for sake of brevity. As illustrated, the exemplary RAIN architecture 400 comprises a cluster storage construct 402 having 8 nodes by 8 disks. Each node manages 8 disks. A disk is identified with a pair node #.disk # (e.g., disk 2.5). A mapped cluster 460 shows how a mapped RAIN 4x4 can be built above the real one. Grey disks (e.g., disk 1.5, disk 2.3, disk 2.4, disk 2.5, etc.) illustrated in cluster storage construct 402 are used to build the mapped RAIN (e.g., mapped cluster 460). In some embodiments, the mapped cluster 460 comprises 4 mapped nodes. Each node manages 4 disks. The total capacity of the mapped RAIN is ¼ of the total capacity of the real one. The disks are distributed between mapped nodes arbitrary. Mapped node 1 manages disks from 3 real nodes. Mapped node 2 manages disks from 1 real node. Mapped nodes 3 and 4 manages disks from 2 real nodes each. It should be noted that there are no pair of mapped nodes that manage disks that belong to one real node.

In some embodiments, the HA mapped cluster can be created wherein all mapped nodes of a HA mapped cluster are divided into HA pairs of mapped nodes. Each HA pair of mapped nodes manages a group of disks. Allocation of disks for a HA pair and orchestration of storage services for a HA pair must guarantee that 1) storage services of mapped nodes from one HA pair run on different physical nodes; and 2) none of the disks managed by a HA pair of mapped nodes is connected to a physical node that runs storage services of a mapped node from the HA pair. Compliance with the rule 1 and 2 allows to fulfil the requirements for HA storage systems. The requirements are that 1) mapped node failure (s) and disk failure(s) are decoupled (e.g., mapped nodes and their disks fail independently; and 2) there is a pair of mapped nodes associated with each disk. Therefore, in case of a mapped node failure, there is still the failed mapped node's mate to manage the still available disks associated with the failed mapped node.

In some embodiments, for the exemplary HA mapped cluster 460, two disks are connected to one real node must not go to different mapped nodes of one mapped RAIN. For example, the mapped nodes form HA groups, e.g. HA pairs, two disks connected to one real node must not go to different HA groups of mapped nodes of one HA mapped RAIN.

Figure 5:
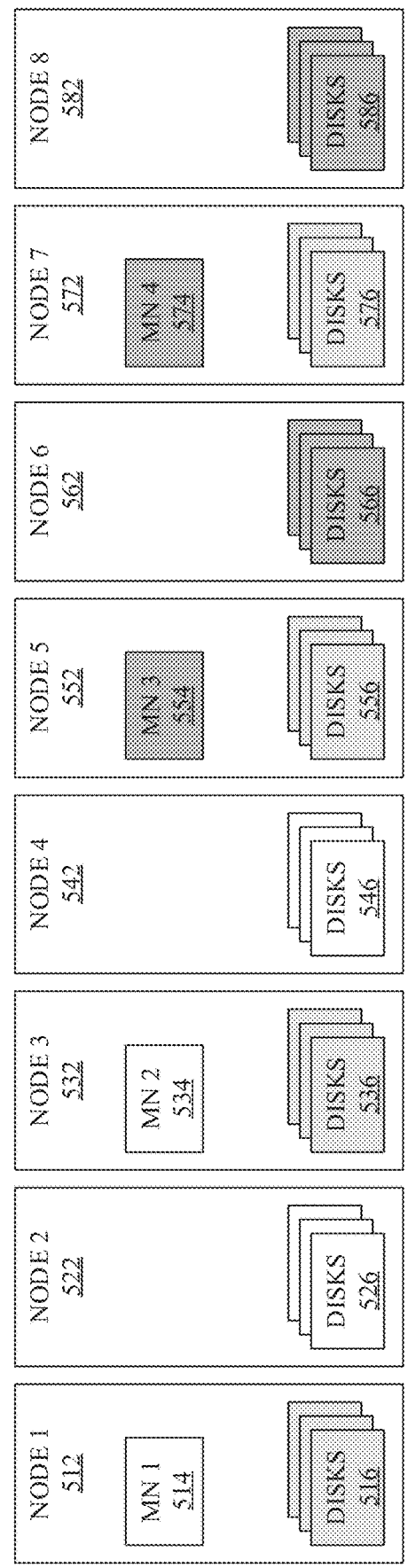
FIG. 5 illustrates an example of real cluster accordance with one or more embodiments described herein.

FIG. 5 illustrates an example of real cluster 500 accordance with one or more embodiments described herein. Repetitive description of like elements employed in respective embodiments is omitted for sake of brevity. In some embodiments, the real cluster 500 comprises 8 real nodes (e.g. 512, 522, 532, 542, 552, 562, 572 and 582). A highly available/accessible (HA) mapped cluster comprise 4 mapped nodes MN1 through MN4 (e.g, 514, 534, 554 and 574). As illustrated, the 4 mapped nodes or HA pairs of mapped nodes (e.g, first pair MN1-MN2 illustrated as white (514 and 534) and second pair MN3-MN4 illustrated as dark (554 and 574)). In some embodiments, the first pair and second pair of HA mapped nodes run on different real nodes (e.g. MN1 514 runs on node 1 512, MN2 534 runs on node 3 532, MN3 554 runs on node 3 552 and MN4 574 runs on node 3 572). In some embodiments, MN1 514 manages the group of disks associated with node 1 512, MN2 534 manages group of disks 536 associated with node 4 532, MN3 554 manages group of disks 556 associated with node 5 552, and MN2 574 manages group of disks 576 associated with node 7 572. In some embodiments, since all the disks are connected, the first pair of MN1-MN2 (e.g., 514 and 534), manage group of disks 526 associated with real node 2 522 and group of disks 546 associated with real node 4 542. Also, since all the disks are connected, the second pair of MN3-MN4 (e.g., 554 and 574), manage group of disks 566 associated with real node 6 562 and group of disks 586 associated with real node 8 582. Failure of one mapped node (e.g., failure of a real node 1 512 that runs MN1 514), is not an issue because the disks mapped to failed node (e.g., group of disks 526 managed by node 1 512) are connected to other real nodes and there is pair mapped node to manage the disks (e.g., MN2 534 that runs on node 3 532 that is connected to group of disks 526). For example, in the event of failure of real node 1 512, in some embodiments, the group of disks managed by MN1 514 (e.g., group of disks 526) can be accessible by the paired node MN2 534. Similar accessibility is available in event of failure of other real nodes that run mapped nodes. For example, in the event of failure of real node 5 552, in some embodiments, the group of disks managed by MN3 554 (e.g., group of disks 556) can be accessible by the paired node MN4 584.

Figure 6:
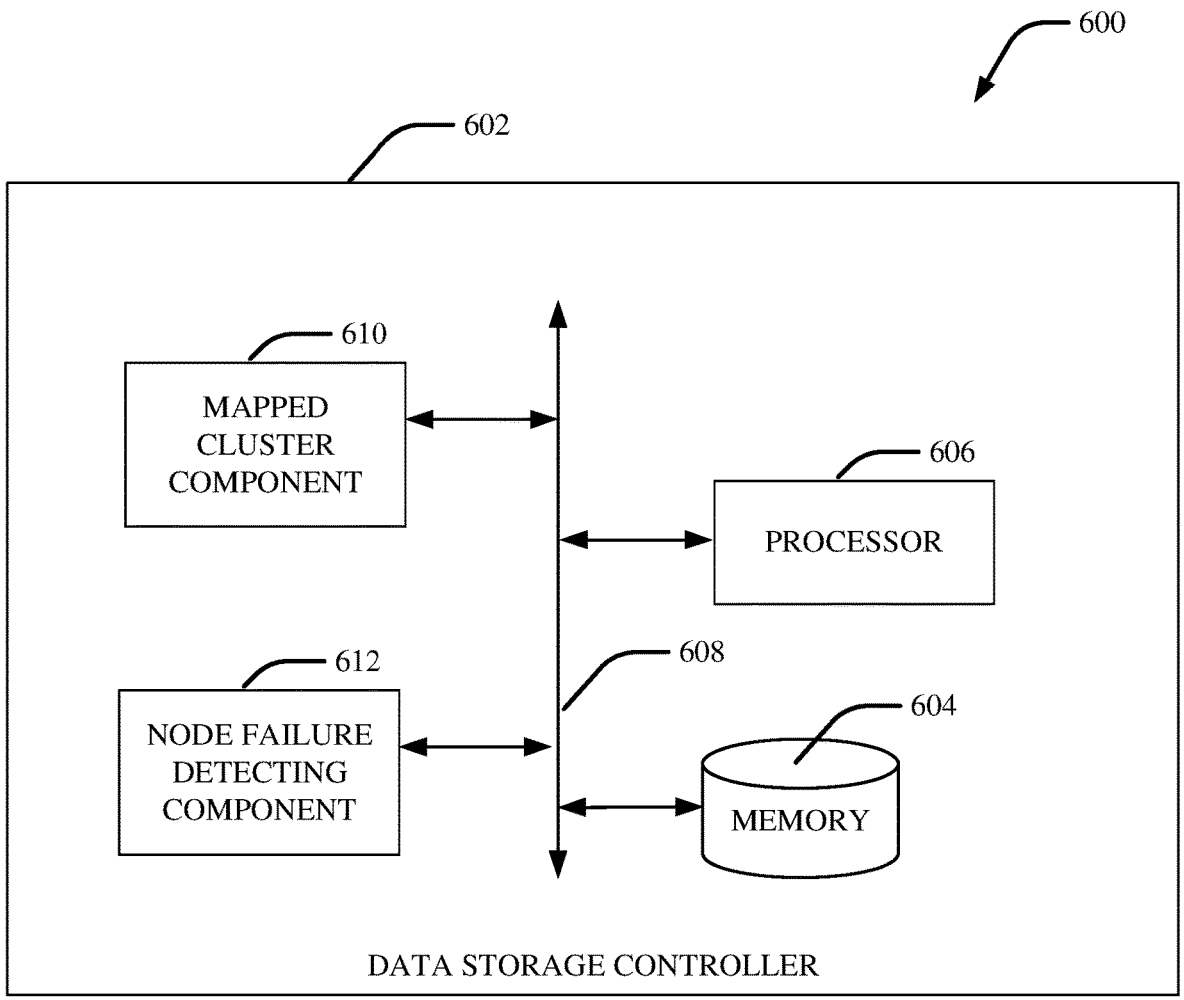
FIG. 6 illustrates an example of a data storage controller operational in a storage system accordance with one or more embodiments described herein.

FIG. 6 illustrates an example of a data storage controller 602 operational in a storage system 600 accordance with one or more embodiments described herein. Repetitive description of like elements employed in respective embodiments is omitted for sake of brevity. In some embodiments, the data storage controller 602 comprises a mapped cluster component 610, a node failure detecting component 612, a processor 606, and memory 604 that are communicatively coupled to each other via a bus 608. In some embodiments, the data storage controller 602 generates the mapping of the nodes and disks to provide the HA storage system. In some embodiment, the mapped cluster component 610 generates a first configuration of a storage cluster (e.g., as described in FIG. 4, above), wherein the storage cluster comprises a group of nodes and a group of disks. In some embodiment, the mapped cluster component 610 further generates a second configuration of the storage cluster (e.g., as described in FIG. 4 and FIG. 5, above) using the first configuration, wherein the group of nodes are divided into a first pair of nodes comprising a first node having access to a first group of disks and a second node having access to a second group of disks. In some embodiment, the mapped cluster component 610 further generates a third configuration of the storage cluster (e.g., as described FIG. 5, above) using the second configuration, wherein the first node comprises a first mapped node that manages the first group of disks of the first node and enables access to the second group of disks of the second node.

In some embodiments, the data storage controller 602 can further comprise a node failure detecting component 612 that can detect an access failure of the first mapped node and/or second mapped node. In some embodiments, in response to the detecting the access failure of the first mapped node, the node failure detecting component 612 can indicate the failure to the mapped cluster component 610, wherein the mapped cluster component 610 uses the second mapped node to access the first group of disks. In some embodiments, in response to the detecting the access failure of the first mapped node, the node failure detecting component 612 can indicate the failure to the mapped cluster component 610, wherein the mapped cluster component 610 uses the second mapped node to access the second group of disks. In some embodiments, in response to the detecting the access failure of the second node, the node failure detecting component 612 can indicate the failure to the mapped cluster component 610, wherein the mapped cluster component 610 uses the first mapped node to access the second group of disks associated with the second node.

Aspects of the processor 606 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described herein. In an aspect, memory 304 can store computer executable components and instructions. It is noted that the memory 304 can comprise volatile memory(s) or nonvolatile memory(s), or can comprise both volatile and nonvolatile memory(s). Examples of suitable types of volatile and non-volatile memory are described below with reference to FIG. 11. The memory (e.g., data stores, databases) 304 of the subject systems and methods is intended to comprise, without being limited to, these and any other suitable types of memory.

Figure 7:
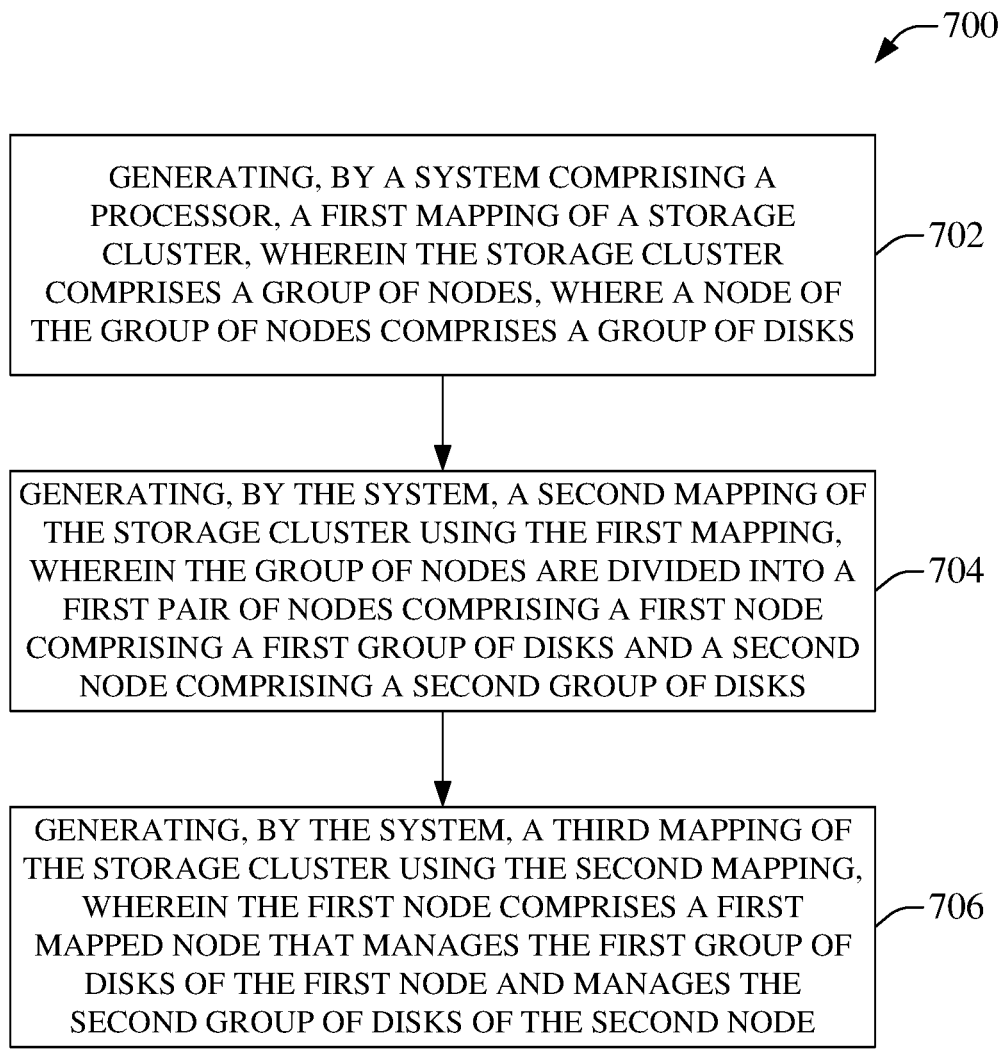
FIG. 7 depicts a diagram of an example, non-limiting computer implemented method that facilitates storage of data in a mapped redundant array of independent nodes.

FIG. 7 depicts a diagram of an example, non-limiting computer implemented method that facilitates storage of data in a mapped redundant array of independent nodes. Repetitive description of like elements employed in other embodiments described herein is omitted for sake of brevity. In some examples, flow diagram 700 can be implemented by operating environment 1100 described below. It can be appreciated that the operations of flow diagram 700 can be implemented in a different order than is depicted.

In non-limiting example embodiments, a computing device (or system) (e.g., computer 1112) is provided, the device or system comprising one or more processors and one or more memories that stores executable instructions that, when executed by the one or more processors, can facilitate performance of the operations as described herein, including the non-limiting methods as illustrated in the flow diagrams of FIG. 7.

Operation 702 depicts generating, by a system comprising a processor, a first mapping of a storage cluster, wherein the storage cluster comprises a group of nodes, where a node of the group of nodes comprises a group of disks. Operation 704 depicts generating a second mapping of the storage cluster using the first mapping, wherein the group of nodes are divided into a first pair of nodes comprising a first node comprising a first group of disks and a second node comprising a second group of disks. Operation 706 depicts generating a third mapping of the storage cluster using the second mapping, wherein the first node comprises a first mapped node that manages the first group of disks of the first node and manages the second group of disks of the second node.

Figure 8:
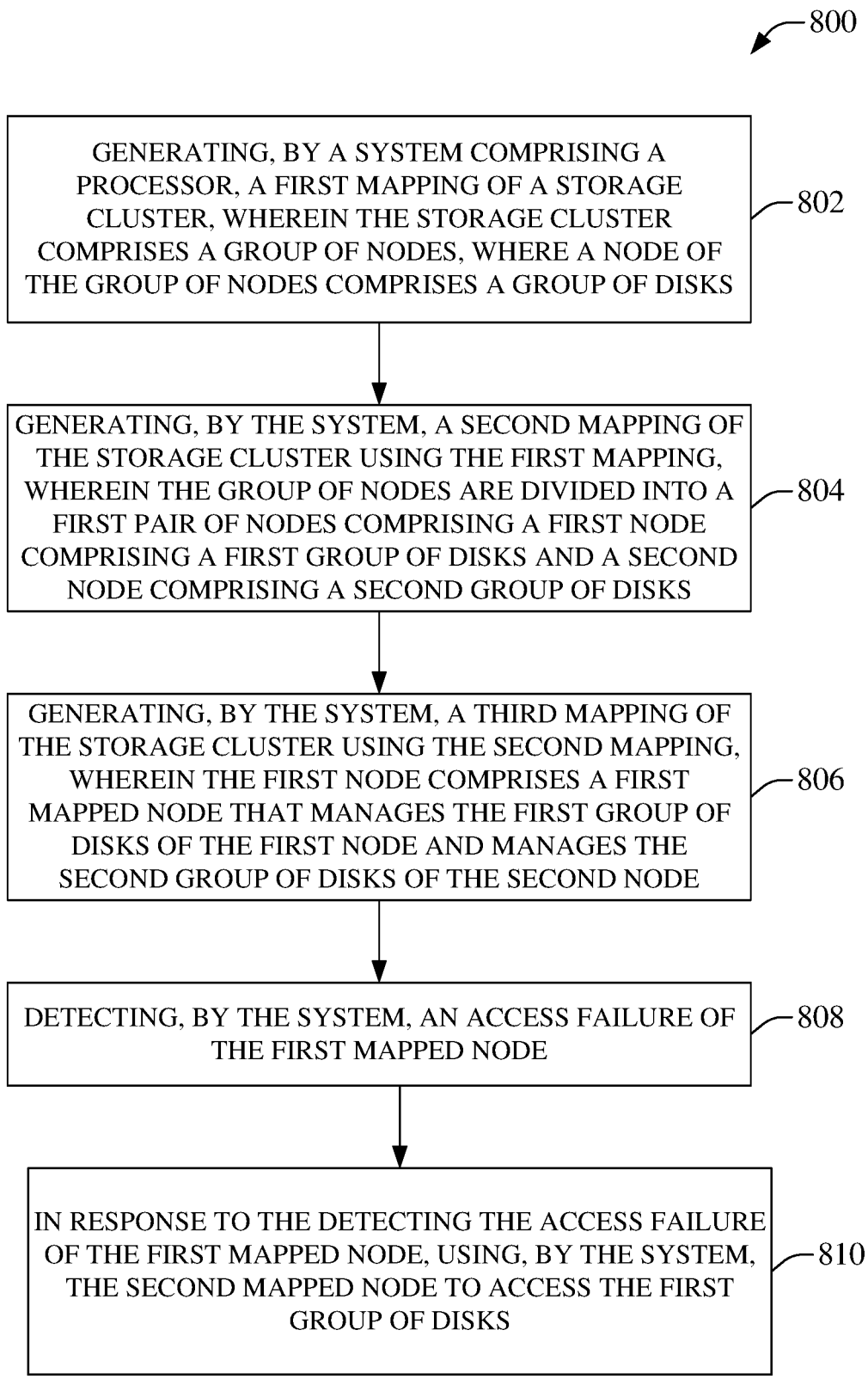
FIG. 8 depicts a diagram of an example, non-limiting computer implemented method that facilitates storage of data in a mapped redundant array of independent nodes.

FIG. 8 depicts a diagram of an example, non-limiting computer implemented method that facilitates storage of data in a mapped redundant array of independent nodes. Repetitive description of like elements employed in other embodiments described herein is omitted for sake of brevity. In some examples, flow diagram 800 can be implemented by operating environment 1100 described below. It can be appreciated that the operations of flow diagram 800 can be implemented in a different order than is depicted.

In non-limiting example embodiments, a computing device (or system) (e.g., computer 1112) is provided, the device or system comprising one or more processors and one or more memories that stores executable instructions that, when executed by the one or more processors, can facilitate performance of the operations as described herein, including the non-limiting methods as illustrated in the flow diagrams of FIG. 8.

Operation 802 depicts generating, by a system comprising a processor, a first mapping of a storage cluster, wherein the storage cluster comprises a group of nodes, where a node of the group of nodes comprises a group of disks. Operation 804 depicts generating a second mapping of the storage cluster using the first mapping, wherein the group of nodes are divided into a first pair of nodes comprising a first node comprising a first group of disks and a second node comprising a second group of disks. Operation 806 depicts generating a third mapping of the storage cluster using the second mapping, wherein the first node comprises a first mapped node that manages the first group of disks of the first node and manages the second group of disks of the second node. Operation 808 depicts detecting an access failure of the first mapped node. Operations 810 depicts, in response to the detecting the access failure of the first mapped node, using by the system, the second mapped node to access the first group of disks.

Figure 9:
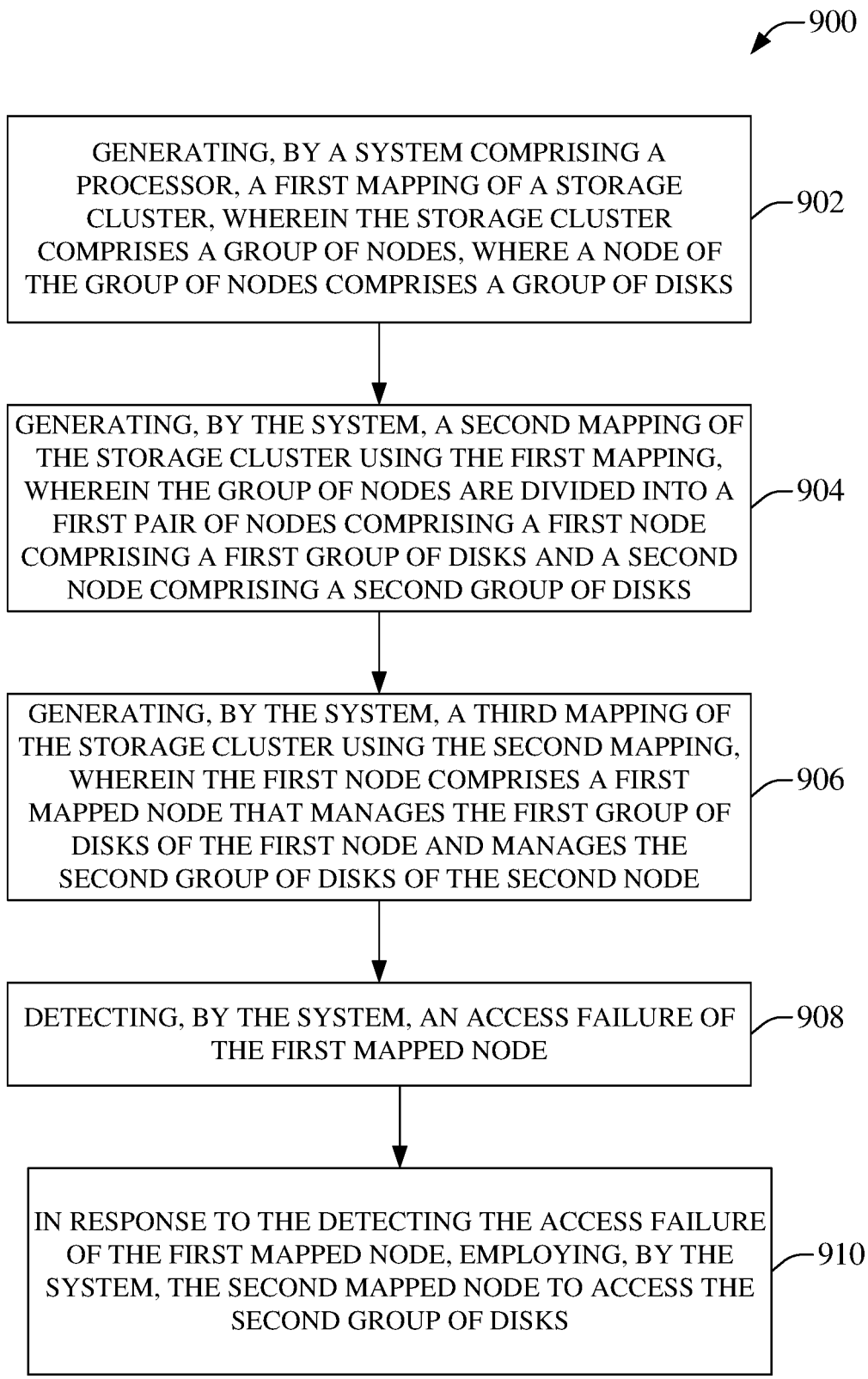
FIG. 9 depicts a diagram of an example, non-limiting computer implemented method that facilitates storage of data in a mapped redundant array of independent nodes.

FIG. 9 depicts a diagram of an example, non-limiting computer implemented method that facilitates storage of data in a mapped redundant array of independent nodes. Repetitive description of like elements employed in other embodiments described herein is omitted for sake of brevity. In some examples, flow diagram 900 can be implemented by operating environment 1100 described below. It can be appreciated that the operations of flow diagram 900 can be implemented in a different order than is depicted.

In non-limiting example embodiments, a computing device (or system) (e.g., computer 1112) is provided, the device or system comprising one or more processors and one or more memories that stores executable instructions that, when executed by the one or more processors, can facilitate performance of the operations as described herein, including the non-limiting methods as illustrated in the flow diagrams of FIG. 9.

Operation 902 depicts generating, by a system comprising a processor, a first mapping of a storage cluster, wherein the storage cluster comprises a group of nodes, where a node of the group of nodes comprises a group of disks. Operation 904 depicts generating a second mapping of the storage cluster using the first mapping, wherein the group of nodes are divided into a first pair of nodes comprising a first node comprising a first group of disks and a second node comprising a second group of disks. Operation 906 depicts generating a third mapping of the storage cluster using the second mapping, wherein the first node comprises a first mapped node that manages the first group of disks of the first node and manages the second group of disks of the second node. Operation 908 depicts detecting an access failure of the first mapped node. Operations 910 depicts, in response to the detecting the access failure of the first mapped node, employing the second mapped node to access the second group of disks.

Figure 10:
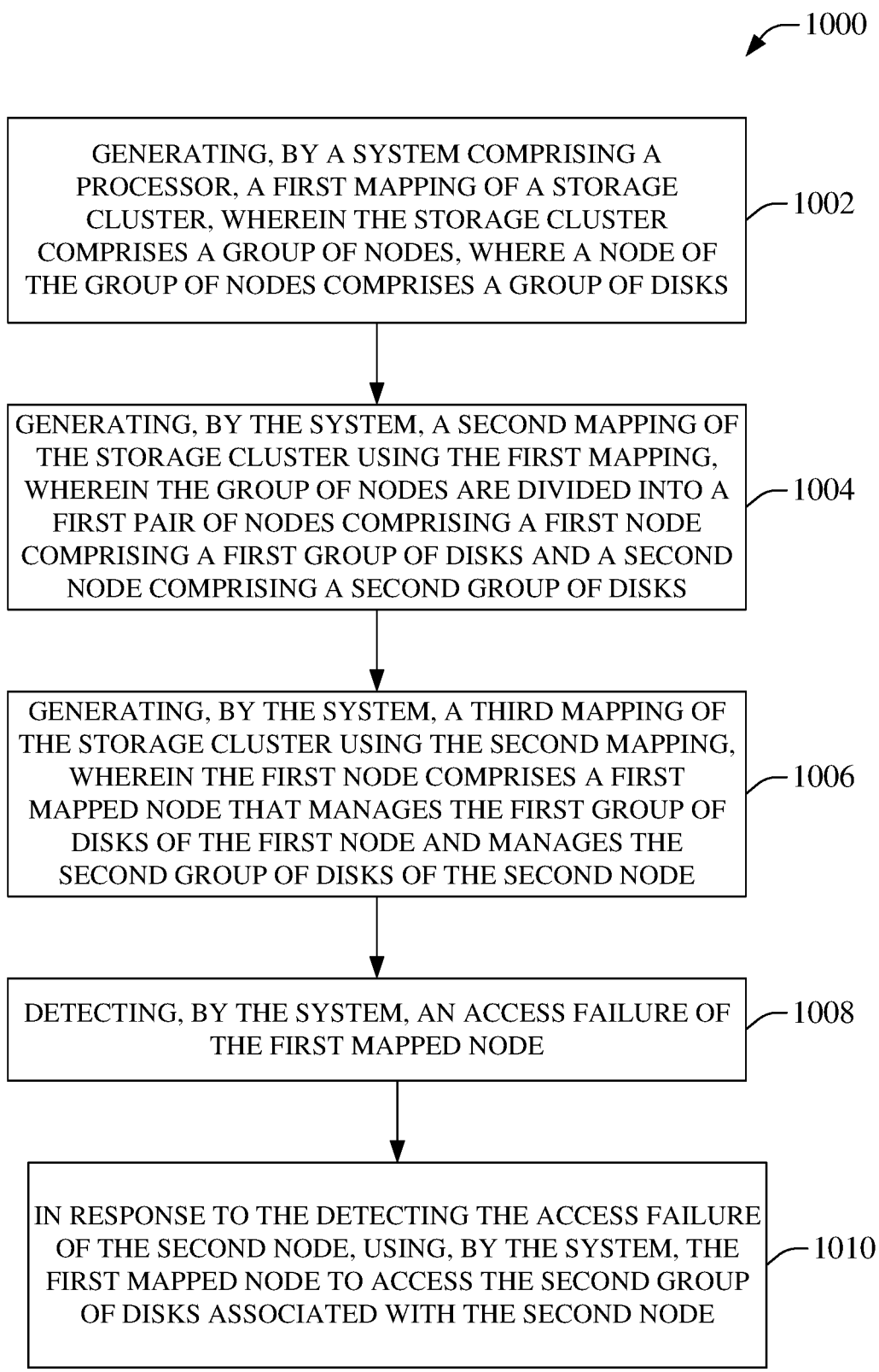
FIG. 10 depicts a diagram of an example, non-limiting computer implemented method that facilitates storage of data in a mapped redundant array of independent nodes.

FIG. 10 depicts a diagram of an example, non-limiting computer implemented method that facilitates storage of data in a mapped redundant array of independent nodes. Repetitive description of like elements employed in other embodiments described herein is omitted for sake of brevity. In some examples, flow diagram 1000 can be implemented by operating environment 1100 described below. It can be appreciated that the operations of flow diagram 1000 can be implemented in a different order than is depicted.

In non-limiting example embodiments, a computing device (or system) (e.g., computer 1112) is provided, the device or system comprising one or more processors and one or more memories that stores executable instructions that, when executed by the one or more processors, can facilitate performance of the operations as described herein, including the non-limiting methods as illustrated in the flow diagrams of FIG. 10.

Operation 1002 depicts generating, by a system comprising a processor, a first mapping of a storage cluster, wherein the storage cluster comprises a group of nodes, where a node of the group of nodes comprises a group of disks. Operation 1004 depicts generating a second mapping of the storage cluster using the first mapping, wherein the group of nodes are divided into a first pair of nodes comprising a first node comprising a first group of disks and a second node comprising a second group of disks. Operation 1006 depicts generating a third mapping of the storage cluster using the second mapping, wherein the first node comprises a first mapped node that manages the first group of disks of the first node and manages the second group of disks of the second node. Operation 1008 depicts detecting an access failure of the second node. Operations 1010 depicts, in response to the detecting the access failure of the second node, using the first mapped node to access the second group of disks associated with the second node.

Figure 11:
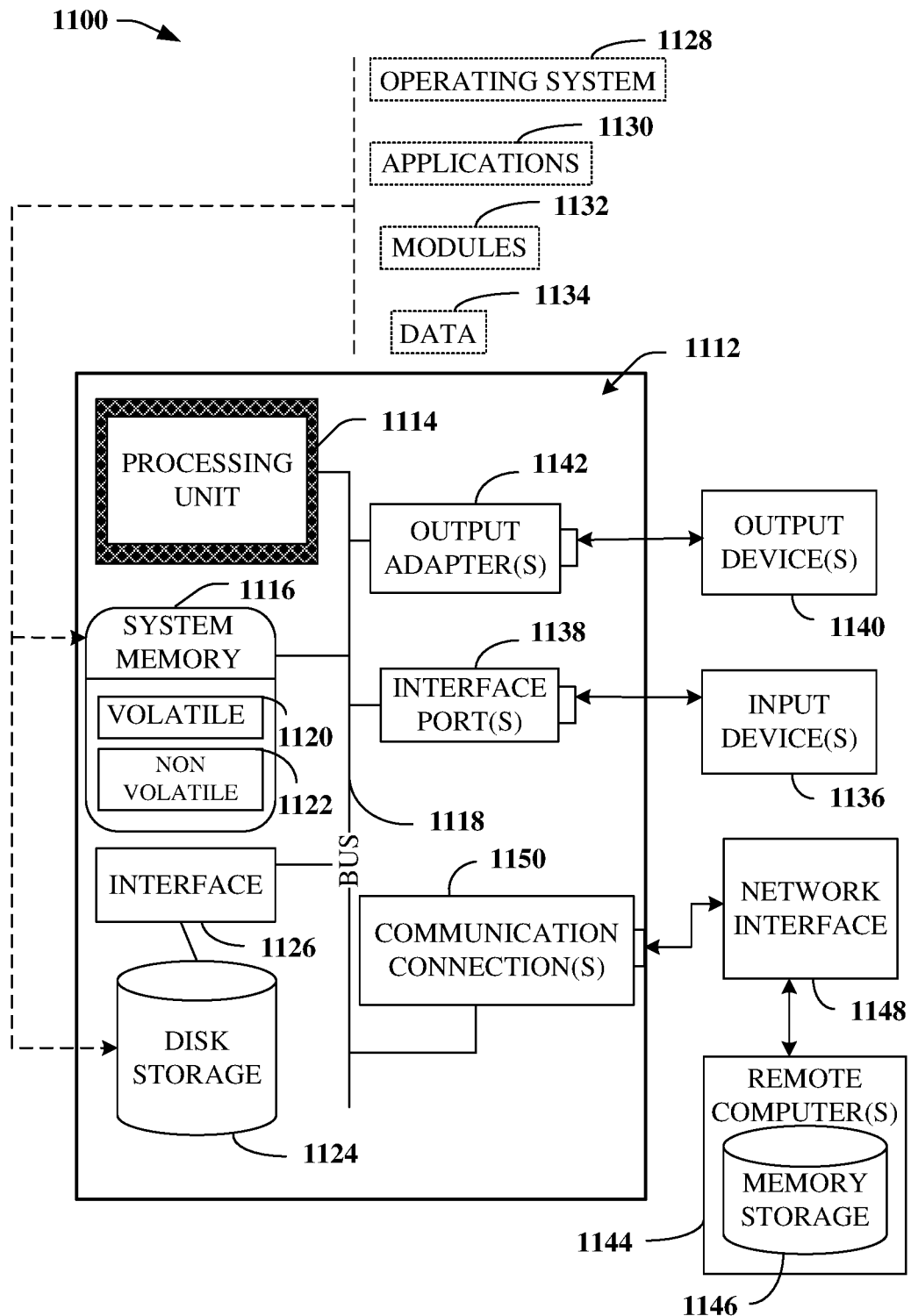
FIG. 11 illustrates a block diagram of an example computer operable to execute mapping of redundant array of independent nodes of a storage device.

FIG. 11 illustrates a block diagram of an example computer operable to execute mapping of redundant array of independent nodes of a storage device. In order to provide additional context for various aspects of the disclosed subject matter, FIG. 11 and the following discussion are intended to provide a brief, general description of a suitable computing environment 1100 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices. The illustrated aspects of the specification can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, (e.g., a carrier wave or other transport mechanism), and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media.

With reference to FIG. 11, a block diagram of a computing system 1100 operable to execute the disclosed systems and methods is illustrated, in accordance with an embodiment. Computer 1112 comprises a processing unit 1114, a system memory 1116, and a system bus 1118. As an example, the component(s), server(s), client(s), node(s), cluster(s), system(s), zone(s), module(s), agent(s), engine(s), manager(s), and/or device(s) disclosed herein with respect to systems 400-900 can each include at least a portion of the computing system 1100. System bus 1118 couples system components comprising, but not limited to, system memory 1116 to processing unit 1114. Processing unit 1114 can be any of various available processors. Dual microprocessors and other multiprocessor architectures also can be employed as processing unit 1114.

System bus 1118 can be any of several types of bus structure(s) comprising a memory bus or a memory controller, a peripheral bus or an external bus, and/or a local bus using any variety of available bus architectures comprising, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1116 comprises volatile memory 1120 and nonvolatile memory 1122. A basic input/output system (BIOS), comprising routines to transfer information between elements within computer 1112, such as during start-up, can be stored in nonvolatile memory 1122. By way of illustration, and not limitation, nonvolatile memory 1122 can comprise ROM, PROM, EPROM, EEPROM, or flash memory. Volatile memory 1120 comprises RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 also comprises removable/non-removable, volatile/non-volatile computer storage media. FIG. 11 illustrates, for example, disk storage 1124. Disk storage 1124 comprises, but is not limited to, devices like a magnetic disk drive, floppy disk drive, tape drive, Jaz drive, Zip drive, LS-100 drive, flash memory card, or memory stick. In addition, disk storage 1124 can comprise storage media separately or in combination with other storage media comprising, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to system bus 1118, a removable or non-removable interface is typically used, such as interface 1126.

It is to be appreciated that FIG. 11 describes software that acts as an intermediary between users and computer resources described in suitable operating environment 1100. Such software comprises an operating system 1128. Operating system 1128, which can be stored on disk storage 1124, acts to control and allocate resources of computer system 1112. System applications 1130 take advantage of the management of resources by operating system 1128 through program modules 1132 and program data 1134 stored either in system memory 1116 or on disk storage 1124. It is to be appreciated that the disclosed subject matter can be implemented with various operating systems or combinations of operating systems.

A user can enter commands or information into computer 1112 through input device(s) 1136. Input devices 1136 comprise, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1114 through system bus 1118 via interface port(s) 1138. Interface port(s) 1138 comprise, for example, a serial port, a parallel port, a game port, a universal serial bus (USB), a wireless based port, e.g., Wi-Fi, Bluetooth®, etc. Output device(s) 1140 use some of the same type of ports as input device(s) 1136.

Thus, for example, a USB port can be used to provide input to computer 1112 and to output information from computer 1112 to an output device 1140. Output adapter 1142 is provided to illustrate that there are some output devices 1140, like display devices, light projection devices, monitors, speakers, and printers, among other output devices 1140, which use special adapters. Output adapters 1142 comprise, by way of illustration and not limitation, video and sound devices, cards, etc. that provide means of connection between output device 1140 and system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. Remote computer(s) 1144 can be a personal computer, a server, a router, a network PC, a workstation, a microprocessor based appliance, a peer device, or other common network node and the like, and typically comprises many or all of the elements described relative to computer 1112.

For purposes of brevity, only a memory storage device 1146 is illustrated with remote computer(s) 1144. Remote computer(s) 1144 is logically connected to computer 1112 through a network interface 1148 and then physically and/or wirelessly connected via communication connection 1150. Network interface 1148 encompasses wire and/or wireless communication networks such as local-area networks (LAN) and wide-area networks (WAN). LAN technologies comprise fiber distributed data interface (FDDI), copper distributed data interface (CDDI), Ethernet, token ring and the like. WAN technologies comprise, but are not limited to, point-to-point links, circuit switching networks like integrated services digital networks (ISDN) and variations thereon, packet switching networks, and digital subscriber lines (DSL).

Communication connection(s) 1150 refer(s) to hardware/software employed to connect network interface 1148 to bus 1118. While communication connection 1150 is shown for illustrative clarity inside computer 1112, it can also be external to computer 1112. The hardware/software for connection to network interface 1148 can comprise, for example, internal and external technologies such as modems, comprising regular telephone grade modems, cable modems and DSL modems, wireless modems, ISDN adapters, and Ethernet cards.

The computer 1112 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1112 can connect to other devices/networks by way of antenna, port, network interface adaptor, wireless access point, modem, and/or the like.

The computer 1112 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This comprises at least Wi-Fi and Bluetooth® wireless technologies. Thus, the communication can be a predefined structure as with a conventional network or simply an ad hoc communication between at least two devices.

The computing system 1100 is operable to communicate with any wireless devices or entities operatively disposed in wireless communication, e.g., desktop and/or portable computer, server, communications satellite, etc. This includes at least Wi-Fi and Bluetooth® wireless technologies. Thus, the communication can be a predefined structure as with a conventional network or simply an ad hoc communication between at least two devices.

Figure 12:
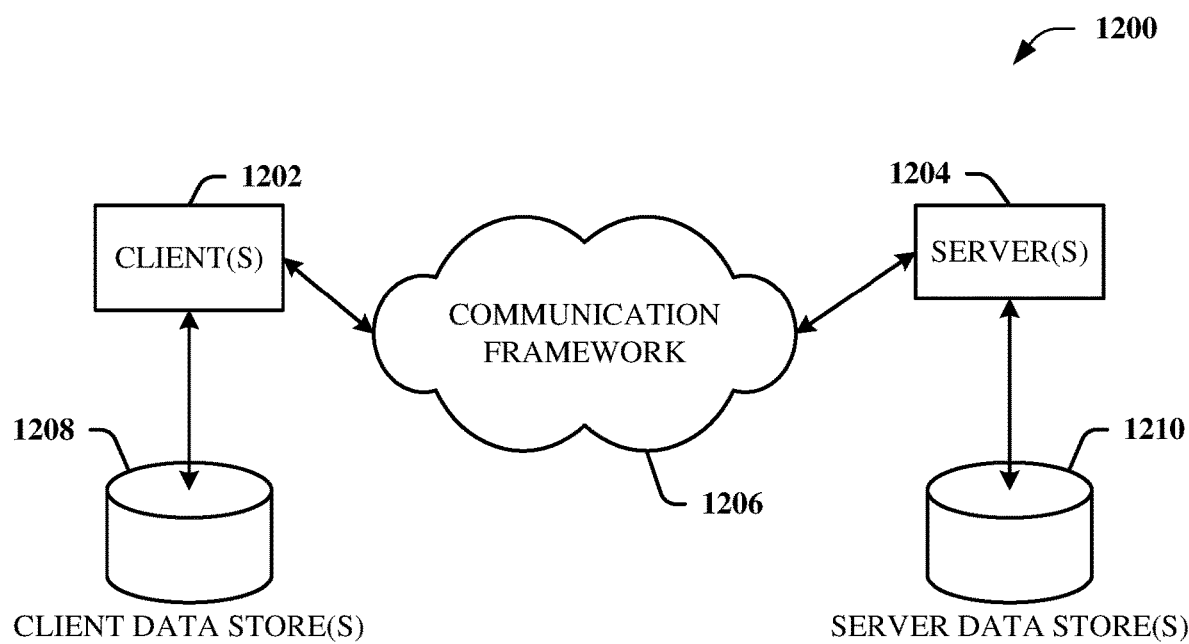
FIG. 12 is a schematic block diagram of a sample computing environment with which the disclosed subject matter can interact.

FIG. 12 is a schematic block diagram of a sample computing environment 1200 with which the disclosed subject matter can interact. The sample computing environment 1200 includes one or more client(s) 1202. The client(s) 1202 can be hardware and/or software (e.g., threads, processes, computing devices). The sample computing environment 1200 also includes one or more server(s) 1204. The server(s) 1204 can also be hardware and/or software (e.g., threads, processes, computing devices). The servers 1204 can house threads to perform transformations by employing one or more embodiments as described herein, for example. One possible communication between a client 1202 and servers 1204 can be in the form of a data packet adapted to be transmitted between two or more computer processes. The sample computing environment 1200 includes a communication framework 1206 that can be employed to facilitate communications between the client(s) 1202 and the server(s) 1204. The client(s) 1202 are operably connected to one or more client data store(s) 1208 that can be employed to store information local to the client(s) 1202. Similarly, the server(s) 1204 are operably connected to one or more server data store(s) 1210 that can be employed to store information local to the servers 1204.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 5 GHz radio band at a 54 Mbps (802.11a) data rate, and/or a 2.4 GHz radio band at an 11 Mbps (802.11b), a 54 Mbps (802.11g) data rate, or up to a 600 Mbps (802.11n) data rate for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations In the subject specification, terms such as "data store," data storage," "database," "cache," and substantially any other information storage component relevant to operation and functionality of a component, refer to "memory components," or entities embodied in a "memory" or components comprising the memory. It is noted that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Furthermore, the terms "user," "consumer," "client," and the like are employed interchangeably throughout the subject specification, unless context warrants particular distinction(s) among the terms. It is noted that such terms can refer to human entities or automated components/devices supported through artificial intelligence (e.g., a capacity to make inference based on complex mathematical formalisms), which can provide simulated vision, sound recognition and so forth.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

Artificial intelligence-based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used to dynamically perform operations as described herein.

A classifier can be a function that maps an input attribute vector, x=(x1, x2, x3, x4, xn), to a confidence that the input belongs to a class, that is, f(x)=confidence (class). Such classification can employ a probabilistic and/or statistical-based analysis (e.g., factoring into the analysis utilities and costs) to infer an action that a user desires to be automatically performed. In the case of communication systems, for example, attributes can be information received from access points, servers, components of a wireless communication network, etc., and the classes can be categories or areas of interest (e.g., levels of priorities). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

In accordance with various aspects of the subject specification, artificial intelligence-based systems, components, etc. can employ classifiers that are explicitly trained, e.g., via a generic training data, etc. as well as implicitly trained, e.g., via observing characteristics of communication equipment, e.g., a server, etc., receiving reports from such communication equipment, receiving operator preferences, receiving historical information, receiving extrinsic information, etc. For example, support vector machines can be configured via a learning or training phase within a classifier constructor and feature selection module. Thus, the classifier(s) can be used by an artificial intelligence system to automatically learn and perform a number of functions.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
   generating a first configuration of a storage cluster, wherein the storage cluster comprises a group of nodes and a group of disks;
   generating a second configuration of the storage cluster using the first configuration, wherein the group of nodes are divided into a first pair of nodes comprising a first node having access to a first group of disks and a second node having access to a second group of disks; and
   generating a third configuration of the storage cluster using the second configuration, wherein the first node comprises a first mapped node that manages the first group of disks of the first node and enables access to the second group of disks of the second node, wherein the first mapped node operates on a third node that is separate from the first node and from the second node, wherein a highly available pair of mapped nodes comprises the first mapped node and a second mapped node that operates on a fourth node, and wherein the second mapped node is configured to manage the first group of disks in case of failover from the first mapped node.

2. The system of claim 1, wherein the generating the second configuration further comprises dividing the storage cluster into a second pair of nodes comprising a fifth node having access to a third group of disks and a sixth node having access to a fourth group of disks.

3. The system of claim 2, wherein the generating the third configuration further comprises a third mapped node associated with the fifth node that manages the third group of disks and enables access to the fourth group of disks of the sixth node.

4. The system of claim 3, wherein the operations further comprise:
   detecting an access failure of the first mapped node; and
   in response to the detecting the access failure of the first mapped node, using the second mapped node to access the first group of disks.

5. The system of claim 4, wherein the operations further comprise:
   in response to the detecting the access failure of the first mapped node, using the second mapped node to access the second group of disks.

6. The system of claim 3, wherein the operations further comprise:
   detecting an access failure of the first mapped node; and
   in response to the detecting the access failure of the first mapped node, using the second mapped node to access the second group of disks.

7. The system of claim 3, wherein the second mapped node manages the third group of disks that are selected from at least two nodes of group of nodes.

8. The system of claim 2, wherein the operations further comprise:
   detecting an access failure of the second node; and
   in response to the detecting the access failure of the second node, using the first mapped node to access the second group of disks associated with the second node.

9. The system of claim 1, wherein the first mapped node manages the first group of disks that are selected from at least two nodes of the group of nodes.

10. A method, comprising:
    generating, by a system comprising a processor, a first mapping of a storage cluster, wherein the storage cluster comprises a group of nodes, where a node of the group of nodes comprises a group of disks;
    generating, by the system, a second mapping of the storage cluster using the first mapping, wherein the group of nodes are divided into a first pair of nodes comprising a first node comprising a first group of disks and a second node comprising a second group of disks; and
    generating, by the system, a third mapping of the storage cluster using the second mapping, wherein the first node comprises a first mapped node that manages the first group of disks of the first node and manages the second group of disks of the second node, wherein the first mapped node operates on a third node that is separate from the first node and from the second node, and wherein a highly available pair of mapped nodes comprises the first mapped node and a second mapped node that operates on a fourth node, and wherein the second mapped node is configured to manage the first group of disks in case of failover from the first mapped node.

11. The method of claim 10, wherein the generating the second mapping further comprises dividing the storage cluster into a second pair of nodes comprising a fifth node managing a third group of disks and a sixth node managing a fourth group of disks.

12. The method of claim 11, wherein the generating the third mapping further comprises a third mapped node associated with the fifth node that manages the third group of disks and provides access to the fourth group of disks of the fourth node.

13. The method of claim 12, further comprising:
detecting, by the system, an access failure of the first mapped node; and
in response to the detecting the access failure of the first mapped node, using, by the system, the second mapped node to access the first group of disks.

14. The method of claim 12, further comprising:
detecting, by the system, an access failure of the first mapped node; and
in response to the detecting the access failure of the first mapped node, employing, by the system, the second mapped node to access the second group of disks.

15. The method of claim 11, further comprising:
detecting, by the system, an access failure of the second node; and
in response to the detecting the access failure of the second node, using, by the system, the first mapped node to access the second group of disks associated with the second node.

16. A non-transitory machine-readable medium, comprising executable instructions that, when executed by a processor, facilitate performance of operations, comprising:
generating a first mapping of a storage cluster, wherein the storage cluster comprises a group of nodes, where a node of the group of nodes comprises a group of disks;
generating a second mapping of the storage cluster using the first mapping, wherein the group of nodes are divided into a first pair of nodes comprising a first node comprising a first group of disks and a second node comprising a second group of disks; and
generating a third mapping of the storage cluster using the second mapping, wherein the first node comprises a first mapped node that manages the first group of disks of the first node and manages the second group of disks of the second node, and wherein the first mapped node operates on a third node that is separate from the first node and from the second node, wherein a highly available pair of mapped nodes comprises the first mapped node and a second mapped node that operates on a fourth node, and wherein the second mapped node is configured to manage the first group of disks in case of failover from the first mapped node.

17. The non-transitory machine-readable medium of claim 16, wherein the generating the second mapping further comprises dividing the storage cluster into a second pair of nodes comprising a fourth node managing a third group of disks and a fifth node managing a fourth group of disks.

18. The non-transitory machine-readable medium of claim 17, wherein the generating the third mapping further comprises a second mapped node associated with the fourth node that manages the third group of disks and provided access to the fourth group of disks of the fourth node.

19. The non-transitory machine-readable medium of claim 18, wherein the operations further comprise:
detecting an access failure of the first mapped node; and
in response to the detecting the access failure of the first mapped node, employing the second mapped node to access the first group of disks.

20. The non-transitory machine-readable medium of claim 18, wherein the operations further comprise:
detecting an access failure of the first mapped node; and
in response to the detecting the access failure of the first mapped node, employing the second mapped node to access the second group of disks.

* * * * *